E. M. BABLE.
NUT LOCK.
APPLICATION FILED JUNE 30, 1917.

1,261,004.

Patented Apr. 2, 1918.

Inventor
EDWARD M BABLE
By Watson E. Coleman
Attorney

UNITED STATES PATENT OFFICE.

EDWARD MILTON BABLE, OF SISTERSVILLE, WEST VIRGINIA, ASSIGNOR OF ONE-HALF TO TECUMSEH S. HANES, OF KANAUGA, OHIO.

NUT-LOCK.

1,261,004. Specification of Letters Patent. Patented Apr. 2, 1918.

Application filed June 30, 1917. Serial No. 177,908.

*To all whom it may concern:*

Be it known that I, EDWARD M. BABLE, a citizen of the United States, residing at Sistersville, in the county of Tyler and State of West Virginia, have invented certain new and useful Improvements in Nut-Locks, of which the following is a specification, reference being had to the accompanying drawings.

This invention relates to certain improvements in nut locks and has relation more particularly to the type of coupled nut and bolt; and it is an object of the invention to provide a novel and improved nut lock including a separable member adapted to interlock with both the bolt and nut for holding the nut against retrograde movement relatively to the bolt.

It is also an object of the invention to provide a nut lock including a separable locking member together with novel and improved means for maintaining said separable member in operative position.

The invention consists in the details of construction and in the combination and arrangement of the several parts of my improved nut lock whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1:
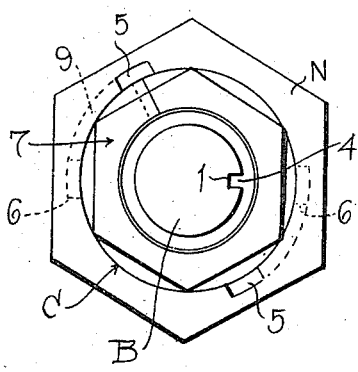
Figure 1 is an elevational view illustrating a nut lock constructed in accordance with an embodiment of my invention.
Figure 2:
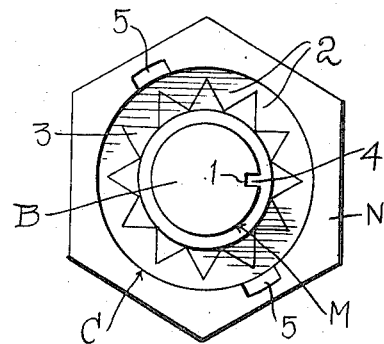
Fig. 2 is an elevational view of my improved nut lock with the retaining member omitted.
Figure 3:
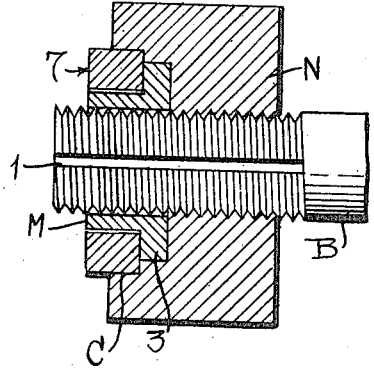
Fig. 3 is a view partly in elevation and partly in section illustrating my nut lock as herein embodied.
Figure 4:
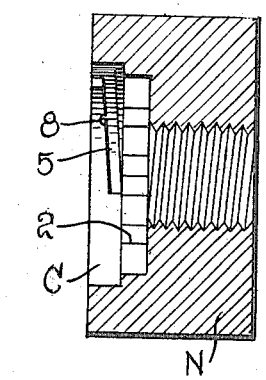
Fig. 4 is a sectional view taken through the nut comprised in my improved lock.
Figure 5:
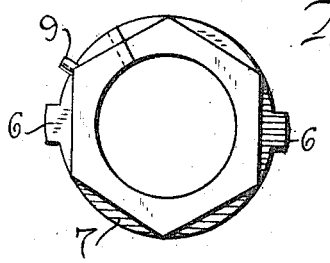
Fig. 5 is an elevational view of the retaining member as herein included.

As disclosed in the accompanying drawings, B denotes a bolt having disposed longitudinally thereof the groove 1, said groove being of a length equal to the length of the threaded portion of the bolt B, and N denotes a nut adapted to be threaded upon the bolt B and having its bore at its outer end enlarged to afford a chamber C.

The inner portion of the chamber C is provided with the teeth 2 which are adapted to interlock or mesh with the toothed annular flange 3 projecting laterally from an end of the locking member M which as herein disclosed, comprises a hollow cylindrical body provided with a longitudinally disposed and inwardly directed key 4 which is adapted to be seated within the groove 1 of the bolt B, whereby it will be perceived that when the flange 3 of the member M is in mesh or interlocked with the teeth 2 within the chamber C, the nut N will be effectively maintained against retrograde movement relatively to the bolt B.

The walls of the chamber C at substantially diametrically opposed points are provided with the open-ended slots 5 substantially of a bayonet type which are adapted to receive the outstanding lugs 6 carried by the retaining member 7 which, as herein embodied, consists of a split annular member possessing a certain degree of inherent resiliency. The outer face portion of the retaining member 7 has its periphery angular so that a suitable wrench may be engaged therewith in order to compress the same to facilitate its application within the chamber C of the nut N in order to hold the locking member M against outward movement relatively of the bolt B.

One of the slots 5 is provided at a predetermined point therealong with the depression or pocket 8 into which is adapted to spring the lip 9 extending from the periphery of the retaining member 7, whereby it will be perceived that the retaining member will be normally held against movement independently of the nut N, whereby the possibility of the same becoming accidentally misplaced is substantially entirely eliminated. Should it be desired to remove the retaining member 7, it is only necessary to compress the same with a wrench or other suitable implement.

From the foregoing description, it is thought to be obvious that a nut lock constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. In combination with a bolt having a groove disposed longitudinally thereof, a nut coacting with the bolt and having the outer end portion of its bore enlarged to afford a chamber, said chamber being provided with an annular series of teeth, a locking member insertible within said chamber and including a hollow cylinder adapted to embrace the bolt, an annular toothed flange carried by the cylinder and adapted to mesh with the teeth within the chamber, an inwardly disposed key carried by the cylinder adapted to be received within the groove of the bolt, the walls of the chamber of the nut being provided with open-ended bayonet slots, and a split annular member provided with outwardly disposed lugs adapted to be received within the slots, said annular member serving to retain the locking member against displacement from within the chamber.

2. In combination with a bolt having a groove disposed longitudinally thereof, a nut coacting with the bolt and having the outer end portion of its bore enlarged to afford a chamber, said chamber being provided with an annular series of teeth, a locking member insertible within said chamber and including a hollow cylinder adapted to embrace the bolt, an annular toothed flange carried by the cylinder and adapted to mesh with the teeth within the chamber, an inwardly disposed key carried by the cylinder adapted to be received within the groove of the bolt, the walls of the chamber of the nut being provided with open-ended bayonet slots, and a split annular member provided with outwardly disposed lugs adapted to be received within the slots, said annular member serving to retain the locking member against displacement from within the chamber, said annular member and nut being provided with coacting means whereby said annular member is normally held against movement independently of the nut.

In testimony whereof I hereunto affix my signature in the presence of two witnesses.

EDWARD MILTON BABLE.

Witnesses:
J. L. BRAFFORD,
L. CECIL HANES.

Copies of this patent may be obtained for five cents each, by addressing the "Commissioner of Patents, Washington, D. C."